June 16, 1925.  H. W. PARTLOW  1,542,517

DIAPHRAGM VALVE

Filed Jan. 25, 1924

Inventor
Howard W. Partlow
By Harry D. Hallau
Attorney

Patented June 16, 1925.

1,542,517

UNITED STATES PATENT OFFICE.

HOWARD W. PARTLOW, OF UTICA, NEW YORK.

DIAPHRAGM VALVE.

Application filed January 25, 1924. Serial No. 688,556.

*To all whom it may concern:*

Be it known that I, HOWARD W. PARTLOW, a citizen of the United States, residing at Utica, in the county of Oneida and State of New York, have invented certain new and useful Improvements in Diaphragm Valves, of which the following is a specification.

This invention relates to diaphragm valves, and has for its object to provide a novel construction and arrangement of the working parts of the device, whereby more powerful and more positive valve action is obtained than heretofore. A further object is to provide a valve of the class, having two diaphragms of unequal size, wherein the smaller diaphragm comprises the valve proper, which controls the fluid pressure or liquid which passes through the device; while the larger diaphragm, which is arranged to be actuated by an independent supply of fluid pressure, exerts a greater power than the valve is capable of exerting and therefore readily and positively seats the valve. The diameters of the two diaphragms may be varied to suit the requirements of the installation or service; but the larger diaphragm is usually two or three times the size of the smaller one. A further object is to provide a piston or plunger, which is interposed between the two diaphragms for transmitting and compounding the power of the larger diaphragm to the valve; the said piston being moved in the direction for closing the valve by the larger diaphragm, and being moved in the opposite direction either by gravity, or by the force of the gas or other medium which is controlled by the valve. And a further object is to provide means for limiting the operative movement of the larger diaphragm for allowing the valve to dispense sufficient gas to prevent the complete extinguishment of a burner between the heating periods.

I attain these objects by the means set forth in the detailed description which follows, and as illustrated by the accompanying drawing, in which—

Figure 1:
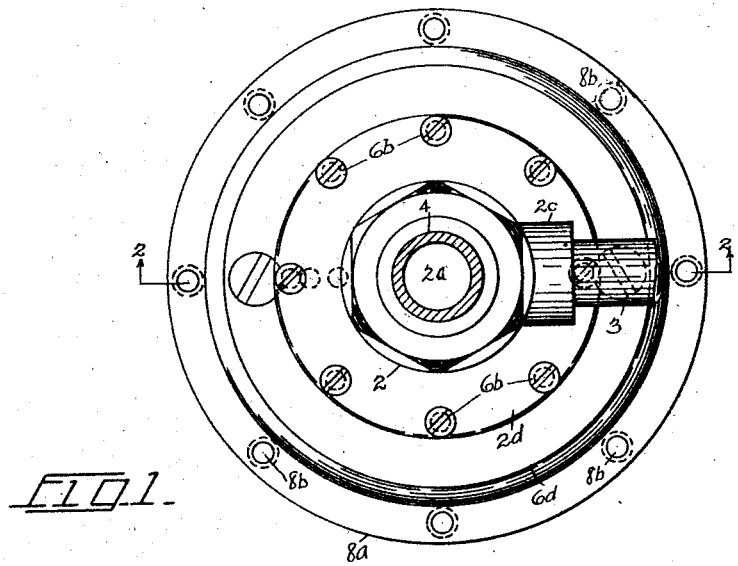
Figure 2:
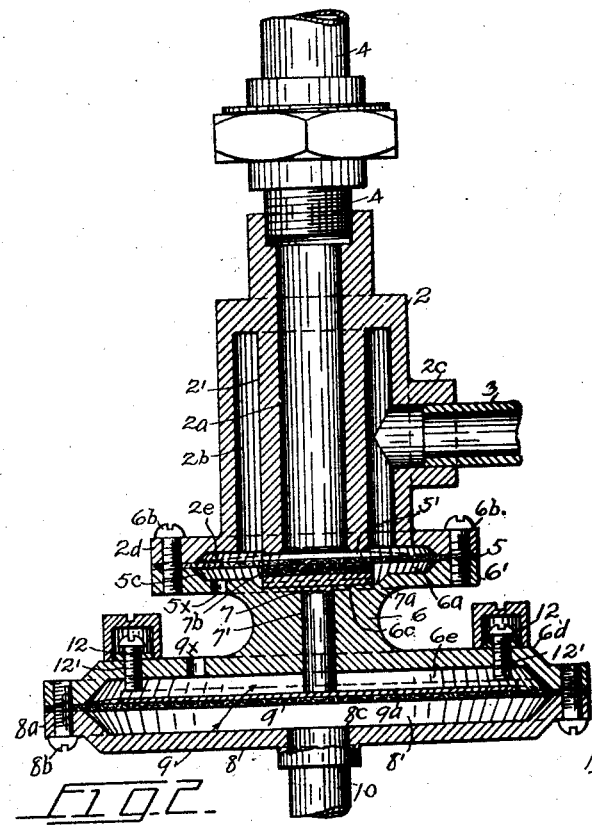

Figure 1 is a top-plan view of the complete device. And Fig. 2 is a central vertical section, taken on line 2—2 of Fig. 1.

In the drawing, 2 represents a hollow cylindrical body, having a concentric inner cylindrical portion 2′, the latter being bored out to provide a gas passage or chamber 2ª, and being surrounded by an annular chamber 2ᵇ. The chamber 2ᵇ has a lateral outlet 2ᶜ, to which a pipe 3 may be connected, for conducting the gas towards a burner; or other part (not shown). The gas may be supplied to the chamber 2ª by a pipe 4. The lower end of the body 2 is provided with an annular flange 2ᵈ, and is also formed with a shallow cavity 2ᵉ. The bottom end of the inner cylinder 2′ comprises the annular seat 5′ for the valve proper, which consists of a flexible diaphragm 5. The body 2 is supported directly by the flanged top 6′ of a part 6, the said top being formed with a similar cavity 6ª, and a corresponding annular flange, and the said parts being secured together by screws 6ᵇ. The cavities 2ᵉ—6ª form a common valve chamber 5ᶜ, which is spanned and divided horizontally by the diaphragm 5; the latter being clamped between the said flanges. Part 6 is bored out axially to receive the stem 7′ of a piston or plunger 7, the top of which is enlarged into a disc-shaped head 7ª, of substantially the same diameter as the seat 5′. The disc 7ª is disposed in the cavity 6ª directly beneath the diaphragm 5, and its top face is preferably covered by a layer of felt or rubber 7ᵇ, which is slightly compressible, for producing a cushion, and therefore a more certain seating effect when the plunger is forced upwardly for closing the valve. When the valve is open the disc 7ª rests upon a ledge 6ᶜ. The bottom of the part 6 comprises a relatively large circular flange 6ᵈ, in which is formed a shallow recess 6ᵉ, and into which the lower end of the stem 7′ projects. 8 represents a circular base, having a diameter corresponding to the portion 6ᵈ, in whose top face is formed a recess 8′, which registers with the recess 6ᵉ, and is surrounded by a flange 8ª. The flanges 6ᵈ and 8ª are secured together by screws 8ᵇ. The base is provided with a central opening 8ᶜ, to which a pipe 10 may be attached. The recesses 6ª—8′ comprise a common chamber 9′, which is divided by a relatively large circular diaphragm 9, the latter being clamped between the flanges 6ᵈ—8ª. Upon the top of the diaphragm 9 is disposed a circular metal plate or armor 9ª, which tends to stiffen the medial portion of the diaphragm, and at the same time affords a metallic footing for the plunger 7. The disc 9ª prevents the relatively small stem 7′ of the piston from puncturing or chafing and wearing-out the diaphragm, and ensures a more positive operation of the valve closing medium, which is desirable, especially when the gas is being supplied at higher than normal pressure. The diaphragm 9 like most diaphragms of the class is adapted to be operated for raising the piston 7 by fluid pressure, either gas, air, or liquid, which may be admitted to the recess 8' beneath the diaphragm 9, and the said diaphragm being of considerably larger diameter than the valve 5, exerts correspondingly greater power for positively closing the valve. In order to ensure the free and unrestricted operation of the two diaphragms, the lower portion of the chamber $5^c$, and the upper portion of the chamber 9' are provided with similar vents $5^x$ and $9^x$, for suitably ventilating said chambers and allowing the free flexing of the diaphragms. The fluid pressure employed for raising the diaphragm 9 may be derived from any suitable source (not shown), as for example, from a governing mechanism, such as is shown in my pending application, Serial No. 676,969.

When my improved diaphragm valve controls the supply of combustible gas for burners or various heaters, it is customary to provide a separate pilot burner, which is constantly lighted, for automatically igniting the fuel-gas, and the said pilot light usually derives the gas from some convenient part of the fuel supply system. In the present case, the usual pilot burner may be dispensed with, and the function of the said extra parts may be performed, in a novel and convenient manner, by the diaphragm valve and the burner, by limiting the valve closing movements of the diaphragm 9 and the plunger 7. To this end, I provide a number of stops consisting of screws 12, which are adjustably applied to threaded openings 12' in the flange $8^a$; the free ends of the said stops projecting into the recess $6^e$, in a manner to be engaged by the disc $9^a$, for arresting the upward movement of the diaphragm 9, and preventing the plunger 7 from fully closing the valve 5. By this arrangement, a small amount of gas may flow from the chamber $2^a$ into chamber $2^b$, and thence escape through the pipe 3. By the provision of the plunger with its head $7^a$ of relatively small diameter, as compared with the diameter of the diaphragm 9, the pressure exerted against the valve 5 is greatly in excess of that of the fuel-gas supply, and thus ensures the positive closing of the valve, and obviates the danger and extravagant waste of the gas. The diaphragm 5 serves to prevent any of the fuel-gas from passing from the chambers $2^a$—$2^b$ into the lower portion of the chamber $5^e$ and thence to the atmosphere through the vent $5^x$. The diaphragm 9, in like manner excludes the fluid pressure from the pipe 10 from entering the cavity $6^e$ and escaping through the vent $9^x$.

Having thus described my invention, what I claim, is—

1. A diaphragm valve comprising a chamber, a diaphragm therein, a disk concentrically secured to the diaphragm, said chamber having an upstanding part formed with a bore, a valve-actuating stem slidably guided by and in the bore of said upstanding part, the lower end of the stem being freely supported on the disk, a circular series of adjustable stops carried by the chamber to engage the marginal portion of the disk, said stops being adjustable exteriorly of the chamber, and valve means carried on the upper end of the stem and normally resting on the upper end portion of the upstanding part.

2. A diaphragm adapted to be flexed by fluid pressure, the medial portion of said diaphragm protected by a metal armour, stops for limiting the flexing of said diaphragm, a plunger normally resting upon said armour adapted to be actuated by the flexing of said diaphragm, said plunger having a cushion-covered disc, a gas receiving cylinder having an annular seat that registers with the disc of the plunger, a concentric cylinder enclosing the first cylinder and having a gas outlet, and a flexible disc valve interposed between said seat and said plunger disc adapted to be moved towards said seat by the flexing of said diaphragm.

3. The combination with a pair of concentric cylinders, the inner cylinder adapted to receive gas, the outer cylinder adapted to discharge the gas through an outlet, the bottom end of the inner cylinder comprising a valve seat, a valve comprising a relatively small diaphragm located below said seat, a diaphragm chamber located below said valve, a relatively large diaphragm in said chamber, means for admitting fluid pressure beneath the larger diaphragm for raising said valve, and a piston interposed between said diaphragm and said valve, the top of said piston comprising a cushion-faced disc substantially the same diameter as said seat normally in free contact with the underside of said valve, the stem of said piston normally resting upon the larger diaphragm adapted when raised by the larger diaphragm to effect the positive closing of said valve.

In testimony whereof I affix my signature.

HOWARD W. PARTLOW.